(12) United States Patent
Takase et al.

(10) Patent No.: US 6,466,199 B2
(45) Date of Patent: *Oct. 15, 2002

(54) METHOD FOR MOVING A POINTING CURSOR

(75) Inventors: Harumi Takase; Tsuyoshi Ogura, both of Fukushima-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,894

(22) Filed: Jul. 16, 1999

(65) Prior Publication Data

US 2002/0003529 A1 Jan. 10, 2002

(30) Foreign Application Priority Data

Jul. 23, 1998 (JP) .......................... 10-207591

(51) Int. Cl.[7] ................................................. G09G 5/08
(52) U.S. Cl. ........................ 345/159; 345/856; 345/157
(58) Field of Search ................................. 345/145–169, 345/339–352, 856–858, 810, 827; 463/37, 38

(56) References Cited

U.S. PATENT DOCUMENTS

| 4,987,411 | A | * | 1/1991 | Ishigami ...................... 340/709 |
| 5,191,641 | A | * | 3/1993 | Yamamoto et al. .......... 395/118 |
| 5,195,179 | A | * | 3/1993 | Tokunaga .................... 345/159 |
| 5,327,161 | A |   | 7/1994 | Logan et al. ................. 345/157 |
| 5,367,631 | A | * | 11/1994 | Levy ........................... 345/163 |
| 5,508,717 | A | * | 4/1996 | Miller .......................... 345/145 |
| 5,786,805 | A | * | 7/1998 | Barry ........................... 345/159 |
| 5,870,079 | A | * | 2/1999 | Hennessy ..................... 345/159 |
| 6,137,472 | A | * | 10/2000 | Pekelney et al. ............ 345/145 |

* cited by examiner

Primary Examiner—Lun-Yi Lao
(74) Attorney, Agent, or Firm—Brinks Hofer Gilson & Lione

(57) ABSTRACT

A method for moving a pointing cursor wherein the pointing cursor moving toward a target to be processed is temporarily halted when it enters an area of the target to be processed, and it is made to move beyond the area to be processed after a predetermined time has elapsed.

6 Claims, 2 Drawing Sheets

METHOD FOR MOVING A POINTING CURSOR

BACKGROUND OF THE INVENTION

1. Field of the Invention

The present invention relates to a method for moving a pointing cursor of a pointing device, such as a mouse.

2. Description of the Prior Art

Conventional pointing cursors move as pointing devices move. Accordingly, if an operator moves a pointing cursor at a certain speed, the pointing device also moves to a desired location at that speed.

Therefore, there has been a problem in that, if a pointing cursor exists in the neighborhood of targets to be processed, such as the boundaries of resizable windows, the maximum indication button, iconified buttons, and menu areas, the pointing cursor might deviate from the targets because of vibration of the pointing device.

SUMMARY OF THE INVENTION

An object of the present invention is to prevent a pointing cursor from moving unintentionally beyond a target to be processed and enable it to move easily beyond the target to be processed when so desired.

To solve the above-described problem, a method of the present invention for moving a pointing cursor temporarily halts the pointing cursor moving toward a target to be processed when it enters an area of the target to be processed, and makes it possible for the pointing cursor to move beyond the area of the target to be processed after a predetermined time has elapsed.

In another aspect of the present invention, the method for moving a pointing cursor slows down a pointing cursor moving toward a target to be processed when it enters an area of the target to be processed.

In another aspect of the present invention, the method for moving a pointing cursor speeds up a pointing cursor moving toward a target to be processed when it comes near a predetermined distance range from the target to be processed, to move it to the target to be processed.

DESCRIPTION OF THE PREFERRED EMBODIMENTS

Figure 1:
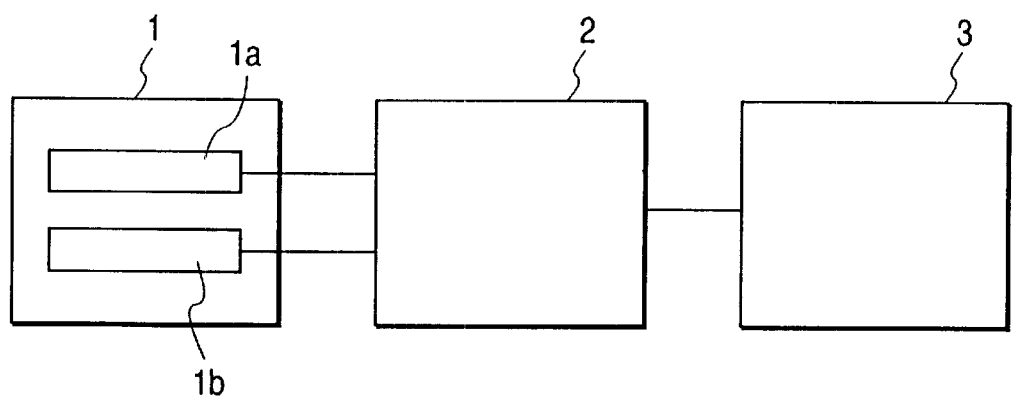
FIG. 1 is a schematic configuration diagram of a window system embodying a method of the present invention for moving a pointing cursor.

Hereinafter, a description will be made of a method of the present invention for moving a pointing cursor with reference to FIGS. 1 and 2. FIG. 1 is a schematic configuration diagram of a window system embodying a method of the present invention for moving a pointing cursor. The window system is composed of an input device 1 having a pointing device 1a such as a mouse, a keyboard for inputting a variety of information, an information processing unit 2 for controlling the entire window system, and a display unit 3 for displaying a variety of information items. The information processing unit 2 contains software (i.e., a computer program) for performing a method of the present invention for moving a pointing cursor in accordance with the flowchart shown in FIG. 2.

Figure 2:
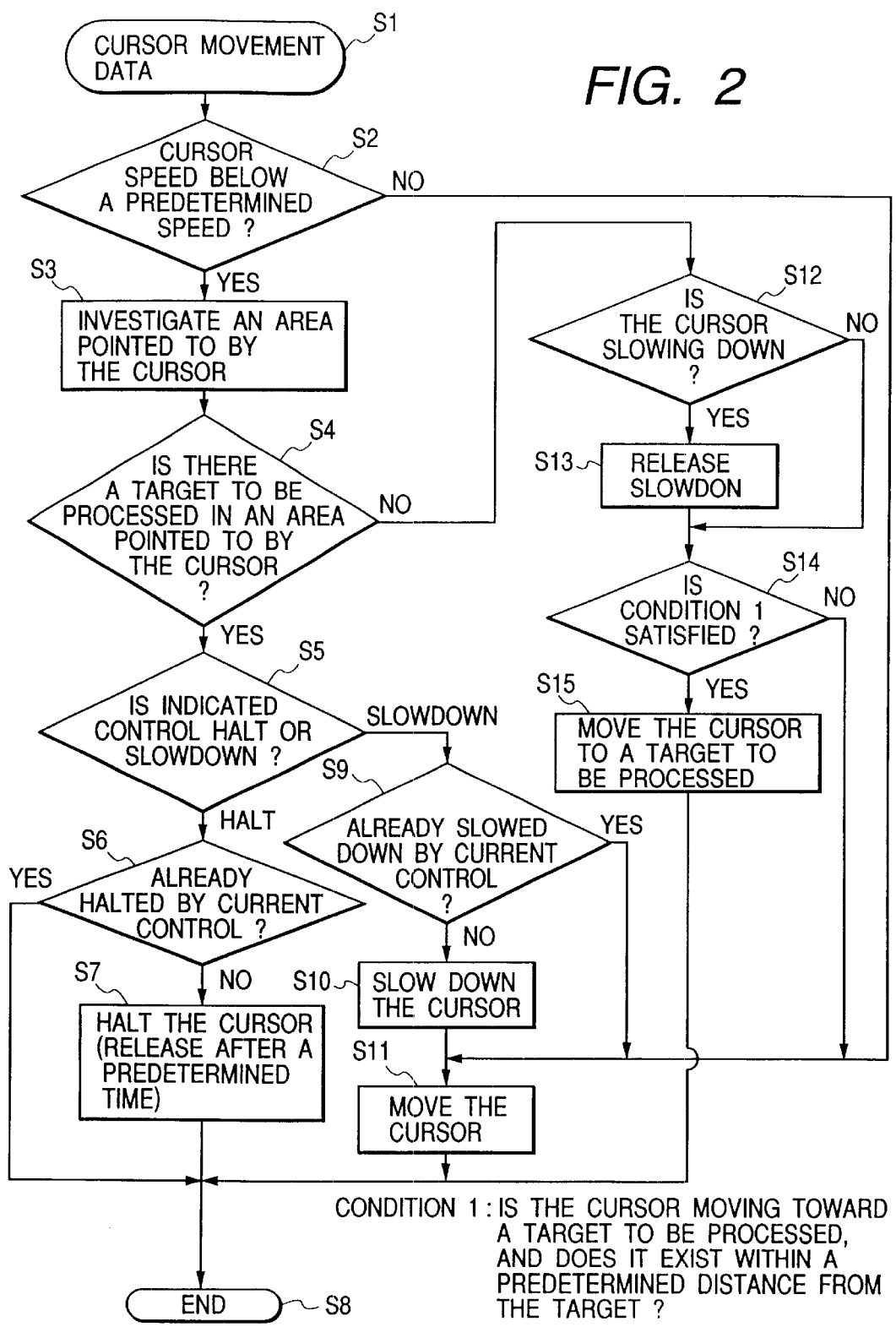
FIG. 2 is a flowchart for executing a method of the present invention for moving a pointing cursor.

A description is made of a method of the present invention for moving a pointing cursor in accordance with the flowchart shown in FIG. 2. A pointing cursor moves as a pointing device moves. In step S1, data of the movement is input to the information processing unit 2. Next, in step S2, it is checked to determine if the pointing cursor moves at a predetermined speed or slower, and if it is determined that it does not move at a predetermined speed or slower, control proceeds to step S11, which moves the pointing cursor at the current speed. On the other hand, in step S2, if it is determined that it moves at a predetermined speed or slower, then in step S3, it is checked by the information processing unit 2 to determine whether the pointing cursor points to a target to be processed, such as the boundaries of windows, icons, iconified buttons, or the maximum indication button.

Depending on whether a target to be processed exists in an area pointed to by the pointing cursor as a result of the checking in step 3, subsequent processing is divided in step S4. If the target to be processed exists in an area pointed to by the pointing cursor, control proceeds to step S5. In step S5, it is determined whether control of the pointing cursor movement is in a halt mode or in a slowdown mode. In the case of the halt mode, in step S6, it is determined whether the pointing cursor has already halted. If the pointing cursor has not halted yet, it is halted by the processing of step 7. If the pointing cursor has already halted, halt processing terminates in step S8. Accordingly, the steps S6 and S7 perform processing for the halt mode.

The halt mode is released in step S7 a predetermined time after the pointing cursor is halted. As a result, if the pointing device moves, the pointing cursor becomes movable again beyond the target to be processed, incident to the movement.

If it is determined in step S5 that control of pointing cursor movement is the slowdown mode, it is determined in step S9 whether the pointing cursor has already slowed down. If not then, the point cursor is slowed down in step S10, and, in step S11, the pointing cursor is moved in a slowdown state to the target to be processed. If it is determined in step S9 that the pointing cursor has already slowed down, then in step S11, it is moved at that speed. Accordingly, the steps S9 and S10 perform processing for the slowdown mode.

On the other hand, if it is determined in step S4 that no target to be processed exists in an area pointed to by the pointing cursor, it is determined in step S12 whether the pointing cursor is slowing down. If it is determined that the pointing cursor is slowing down, the slowdown state is released in step S13 before proceeding to the next step S14. If it is determined in step S12 that the pointing cursor is not slowing down, control proceeds immediately to step S14.

In step S14, it is determined whether the pointing cursor points to a target to be processed (moves to a target to be processed) or exists within a predetermined distance from the target to be processed. If the pointing cursor exists within a predetermined distance from the target to be processed, then step S15, the pointing cursor is sped up toward the target to be processed as if it were attracted to the target to be processed, and processing terminates. On the other hand, if it is determined in step S14 that the pointing cursor does not exist within a predetermined distance from the target to be processed, control proceeds to step S11, the pointing cursor moves, and processing terminates. Accordingly, the steps S14 and S15 perform processing for the attraction mode.

The steps S12 and S13, which release the slowdown state, have no direct relation with the attraction mode.

As described above, in the present invention, when positioning a moving pointing cursor in a target to be processed, if the pointing cursor exists in an area pointed to by it, it is halted or slowed down, and if it does not exist in the area, when it comes near a predetermined distance range from the target to be processed, it is sped up toward the target to be processed. Thereby, the pointing cursor can be easily moved to the target to be processed.

Herein, since the pointing cursor can be moved following a predetermined time after it has halted on a target to be processed, the pointing cursor can subsequently be moved to another target to be processed.

If it is determined in step S2 of FIG. 2 that the pointing cursor moves at a predetermined speed or faster, since the pointing cursor can be moved without executing the above described "halt mode," "slowdown mode," and "attraction mode," whether or not to execute each of the above described modes can be determined simply by changing the movement speed of the pointing cursor.

As has been described above, a method of the present invention for moving a pointing cursor temporarily halts the pointing cursor moving toward a target to be processed when it enters an area of the target to be processed, and makes it possible for the pointing cursor to move beyond the area to be processed after a predetermined time has elapsed. Therefore, the pointing cursor can be easily halted in a target to be processed, and moreover can be moved to another target to be processed.

The method of the present invention for moving a pointing cursor slows down a pointing cursor moving toward a target to be processed when it enters an area of the target to be processed. Therefore, it is easy to bring the pointing cursor near a target to be processed.

The method of the present invention for moving a pointing cursor speeds up a pointing cursor moving toward a target to be processed when it comes near a predetermined distance range from the target to be processed, to move it to the target to be processed. Therefore, a target to be processed can be indicated without having to accurately move the pointing cursor to the target to be processed.

What is claimed is:

1. A method for altering a moving sensitivity of a pointing cursor relative to a movement of a pointing device, comprising the sequential steps of:
   a) first determining if a movement of the pointing device is less than a threshold speed;
   b) if it has been determined in step a) that the movement of said pointing device is less than the threshold speed, then determining if the pointing cursor has entered an area of a target to be processed;
   c) if it has been determined in step b) that said pointing cursor has entered the area of said target to be processed, then altering the moving sensitivity of the pointing cursor by temporarily halting the movement of said pointing cursor relative to the movement of the pointing device at the target to be processed; and
   d) if the moving sensitivity of said pointing cursor has been altered in step c), then permitting said pointing cursor to resume movement beyond said area of said target to be processed after a predetermined time has elapsed.

2. The method for altering the moving sensitivity of the pointing cursor relative to the movement of the pointing device according to claim 1, further comprising the steps of:
   e) if it has been determined in step a) that the movement of said pointing device is less than said threshold speed, then determining if the pointing cursor is moving toward a target to be processed and is within a predetermined distance from said target to be processed; and
   f) if it has been determined in step e) that said pointing cursor is moving toward a target to be processed and is within a predetermined distance from said target to be processed, then altering the moving sensitivity of the pointing cursor by accelerating the movement of said pointing cursor relative to the movement of the pointing device toward the target to be processed.

3. A method for altering a moving sensitivity of a pointing cursor relative to a movement of a pointing device, comprising the sequential steps of:
   a) first determining if a movement of the pointing device is less than a threshold speed;
   b) if it has been determined in step a) that the movement of said pointing device is less than the threshold speed, then determining if the pointing cursor has entered an area of a target to be processed; and
   c) if it has been determined in step b) that said pointing cursor has entered the area of said target to be processed, then altering the moving sensitivity of the pointing cursor by slowing down the movement of said pointing cursor relative to the movement of the pointing device toward the target to be processed.

4. The method for altering the moving sensitivity of the pointing cursor relative to the movement of the pointing device according to claim 3, further comprising the steps of:
   d) if it has been determined in step a) that the movement of said pointing device is less than said threshold speed, then determining if the pointing cursor is moving toward a target to be processed and is within a predetermined distance from said target to be processed; and
   e) if it has been determined in step e) that said pointing cursor is moving toward a target to be processed and is within a predetermined distance from said target to be processed, then altering the moving sensitivity of the pointing cursor by accelerating the movement of said pointing cursor relative to the movement of the pointing device toward the target to be processed.

5. A method for altering a moving sensitivity of a pointing cursor relative to a movement of a pointing device, comprising the steps of:
   a) first determining if a movement of the pointing device is less than a threshold speed;
   b) if a determination has been made in step a) that the movement of the pointing device is less than said threshold speed, then determining if the pointing cursor has entered an area of a target to be processed;
   c) if a determination has been made in step b) that the pointing device has entered the area of said target to be processed, then determining if a halting mode has been activated for the pointing device, and if so, then altering the moving sensitivity of the pointing cursor by temporarily halting the movement of said pointing cursor at the target to be processed; and
   d) if a determination has been made in step b) that the pointing device has entered the area of said target to be processed, then determining if a slowing mode has been activated for the pointing device, and if so, then altering the moving sensitivity of the pointing cursor by slowing down the movement of said pointing cursor relative to the movement of the pointing device toward the target to be processed.

6. A method for altering a moving sensitivity of a pointing cursor relative to a movement of a pointing device, comprising the steps of:

a) first determining if a movement of the pointing device is less than a threshold speed;

b) if a determination has been made in step a) that the movement of the pointing device is less than said threshold speed, then determining if the pointing cursor is moving toward a target to be processed and is within a predetermined distance from said target to be processed, and if so, then altering the moving sensitivity of the pointing cursor by accelerating the movement of said pointing cursor relative to the movement of the pointing device toward the target to be processed;

c) if a determination has been made in step a) that the movement of the pointing device is less than said threshold speed, then determining if the pointing cursor has entered an area of said target to be processed and if a halting mode has been activated for the pointing device, and if so, then altering the moving sensitivity of the pointing cursor by temporarily halting the movement of said pointing cursor at the target to be processed; and d) if a determination has been made in step a) that the movement of the pointing device is less than said threshold speed, then determining if the pointing cursor has entered the area of said target to be processed and if a slowing mode has been activated for the pointing device, and if so, then altering the moving sensitivity of the pointing cursor by slowing down the movement of said pointing cursor relative to the movement of the pointing device toward the target to be processed.

* * * * *